United States Patent
Nickel (10) Patent No.: US 12,436,217 B2
(45) Date of Patent: Oct. 7, 2025

(54) MAGNETIC RESONANCE IMAGING RECONSTRUCTION USING MACHINE LEARNING AND MOTION COMPENSATION

(71) Applicant: Siemens Healthcare GmbH, Erlangen (DE)

(72) Inventor: Marcel Dominik Nickel, Herzogenaurach (DE)

(73) Assignee: Siemens Healthineers AG, Erlangen (DE)

( * ) Notice: Subject to any disclaimer, the term of this patent is extended or adjusted under 35 U.S.C. 154(b) by 822 days.

(21) Appl. No.: 17/411,461

(22) Filed: Aug. 25, 2021

(65) Prior Publication Data
US 2022/0065970 A1    Mar. 3, 2022

(30) Foreign Application Priority Data
Aug. 26, 2020 (DE) .......................... 102020210775.0

(51) Int. Cl.
| | |
|---|---|
| G06T 7/00 | (2017.01) |
| G01R 33/56 | (2006.01) |
| G01R 33/565 | (2006.01) |
| G06T 3/18 | (2024.01) |
| G06T 3/4046 | (2024.01) |

(52) U.S. Cl.
CPC ... *G01R 33/56509* (2013.01); *G01R 33/5608* (2013.01); *G06T 3/18* (2024.01); *G06T 3/4046* (2013.01); *G06T 7/0012* (2013.01); *G06T 7/0016* (2013.01); *G06T 7/0014* (2013.01); G06T 2207/10088 (2013.01); G06T 2207/20081 (2013.01)

(58) Field of Classification Search
CPC . G06T 2207/10088; G06T 2207/20221; G06T 2207/20172; G06T 5/00; G06V 10/751; G06V 10/30; G06V 10/25
See application file for complete search history.

(56) References Cited

U.S. PATENT DOCUMENTS

| | | | |
|---|---|---|---|
| 5,459,401 A | 10/1995 | Kiefer | |
| 10,884,086 B1* | 1/2021 | Ersoz | G01R 33/482 |
| 11,360,180 B2* | 6/2022 | Yap | G01R 33/56509 |
| 11,696,700 B2* | 7/2023 | Rotman | G01R 33/4818 |
| | | | 600/411 |
| 2008/0054899 A1* | 3/2008 | Aksoy | G01R 33/5611 |
| | | | 324/307 |
| 2019/0236817 A1* | 8/2019 | Cheng | G01R 33/5608 |
| 2019/0257905 A1* | 8/2019 | Cheng | G01R 33/5608 |
| 2020/0105031 A1* | 4/2020 | Cheng | G06N 3/084 |

(Continued)

OTHER PUBLICATIONS

Balakrishnan et al, An Unsupervised Learning Model for Deformable Medical Image Registration (Year: 2018).*

(Continued)

*Primary Examiner* — Chan S Park
*Assistant Examiner* — Sebastian-Sy Vuchi Ngo
(74) *Attorney, Agent, or Firm* — Banner & Witcoff Ltd.

(57) ABSTRACT

The disclosure relates to MRI reconstruction of multiple MRI measurement datasets acquired throughout a measurement time duration. Patient motion can occur during the measurement time duration. Warping operators, sometimes also referred to as motion field, are incorporated into an iterative optimization of the MRI reconstruction.

20 Claims, 3 Drawing Sheets

(56) References Cited

U.S. PATENT DOCUMENTS

| | | | |
|---|---|---|---|
| 2020/0230419 A1* | 7/2020 | Madhavan | G01R 33/4806 |
| 2020/0249301 A1* | 8/2020 | Polak | G01R 33/5611 |
| 2020/0272905 A1* | 8/2020 | Saripalli | G06N 3/082 |
| 2022/0067987 A1 | 3/2022 | Nickel | |
| 2023/0129194 A1* | 4/2023 | Vazquez Romaguera | G06T 7/0012 378/65 |

OTHER PUBLICATIONS

Wu et al, An_improved_total_variation_regularized_Sense_reconstruction_for_MRI_images (Year: 2017).*

Ponti et al, Everything_You_Wanted_to_Know_about_Deep_Learning_for_Computer_Vision_but_Were_Afraid_to_Ask (Year: 2017).*

German Action dated Jun. 11, 2021, Application No. 10 2020 210 775.0.

Hansen, Michael S., et al. Retrospective reconstruction of high temporal resolution cine images from real-time MRI using iterative motion correction. Magnetic Resonance in Medicine, 2012, 68. Jg., Nr. 3, pp. 741-750. DOI: https://doi.org/10.1002/mrm.23284.

Cordero-Grande, Lucilio, et al. Three-dimensional motion corrected sensitivity encoding reconstruction for multi-shot multi-slice MRI: application to neonatal brain imaging. Magnetic Resonance in Medicine, 2018, 79. Jg., Nr. 3, pp. 1365-1376. 001: https://doi.org/10.1002/mrm.26796.

Knoll, Florian et al., "Deep learning methods for parallel magnetic resonance image reconstruction", Version 1. Jan. 4, 2019. S. 1-14. URL: https://arxiv.org/pdf/1904.01112.pdf [abgerufen am Sep. 1, 2020].—arXiv: 1904.01112v1.

Michael Lustig et al., Compressed Sensing MRI, IEEE Signal Processing Magazine (72), Mar. 2008, pp. 72-82; 2008.

Chen, Mingli et al. "A simple fixed-point approach to in-vert a deformation field a." Medical physics 35.1 (2008): 81-88.

Lustig, Michael; et all; "Sparse MRI: The application of compressed sensing for rapid MR imaging";Magnetic resonance in medicine 58.6 (2007): 1182-1195.; 2007.

Hammernik, Kerstin et al.: "Learning a Variational Network for Reconstruction of Accelerated MRI Data"; in: Magnetic Resonance in Medicine; vol. 79; pp. 3055-3071; 2018; DOI 10.1002/mrm.26977.

De Vos, B. et. al., "A Deep Learning Framework for Unsupervised Affine and Deformable Image Registration", Medical Image Analysis, https://arxiv.org/abs/1809.06130, 2018.

Ronneberger, Olaf et al. "U-Net: Convolutional networks for biomedical image segmentation" 18th International Conference on Medical Image Computing and Computer-Assisted Intervention 2015 (MICCAI 2015); pp. 234-241, Oct. 5-9, 2015 // DOI: 10.1007/978-3-319-24571-3 // arXiv:1505.04597v1 [cs.CV].

Krebs, Julian et al.: "Unsupervised Probabilistic Deformation Modeling for Robust Diffeomorphic Registration"; arXiv:1804.07172v2; 2018; 2018.

Pruessmann, Klaas P. et al., "SENSE: Sensitivity Encoding for Fast MRI", Magnetic Resonance in Medicine, vol. 42, No. 5, pp. 952-962, Nov. 1999 (First published: Oct. 28, 1999) //https://doi.org/10.1002/(SICI)1522-2594(199911)42:5<952::AID-MRM16>3.0.CO;2-S.

G. Balakrishnan, A. Zhao, M. R. Sabuncu, J. Guttag, and A. V.Dalca, "An unsupervised learning model for deformable medical image registration," in Proceedings of the IEEE Conference on Computer Vision and Pattern Recognition, 2018, pp. 9252-9260.; 2018.

Liu, Jiaming et al. "RARE: Image Reconstruction using Deep Priors Learned without Groundtruth" arXiv:1912.05854v2, May 23, 2020; 2020.

Feinberg et al. (GRASE (Gradient- and Spin-Echo) MR Imaging: A New Fast Clinical Imaging Technique, Radiology 1991; 181: 597-602).

Usman et al. (Motion Corrected Compressed Sensing for Free-Breathing Dynamic Cardiac MRI, Magnetic Resonance in Medicine 70:504-516 (2013)).

Knoll et al, "Deep Learning Methods for Parallel Magnetic Resonance Image Reconstruction," arXiv:1904.01112v1 [eess.SP], pp. 1-14 (2019).

De Vos et al., "A Deep Learning Framework for Unsupervised Affine and Deformable Image Registration," Medical Image Analysis, pp. 1-20 (2018).

Krebs et al., "Unsupervised Probabilistic Deformation Modeling for Robust Diffeomorphic Registration," arXiv:1804.07172v2 [cs.CV], pp. 1-8 (2018).

Arefeen, Y., "Acquisition and Reconstruction Techniques for Improving Rapid Magnetic Resonance Imaging with Applications in Fetal Imaging," Submitted to the Department of Electrical Engineering and Computer Science in partial fulfillment of the requirements for the degree of Master of Science in Electrical Engineering and Computer Science at the Massachusetts Institute of Technology, pp. 1-68 (2019).

Elster, A., Questions and Answers in MRI, "Grase", URL: http://mriquestions.com/grase.html, [recherchiert/abgerufen am Jul. 6, 2021].

Ronneberger et al., "U-Net: Convolutional Networks for Biomedical Image Segmentation," 18th International Conference on Medical Image Computing and Computer-Assisted Intervention 2015 (MICCAI 2015), arXiv:1505.04597v1 [cs.CV], pp. 234-241 (2015).

Bustin et al., "High-dimensionality undersampled patch-based reconstruction (HD-PROST) for accelerated multi-contrast MRI," Magnetic Resonance in Medicine, vol. 81, pp. 3705-3719 (2019).

Tamir et al., "T2 Shuffling: Sharp, Multi-Contrast, Volumetric Fast Spin-Echo Imaging," Magn Reson Med., vol. 77, pp. 180-195 (2017).

DE Office Action for German Application No. 10 2020 210 776.9, dated Sep. 3, 2020.

Lustig et al, "Sparse MRI: The Application of Compressed Sensing for Rapid MR Imaging," Magnetic Resonance in Medicine, vol. 58, pp. 1182-1195 (2007).

Lustig et al., "Compressed Sensing MRI," IEEE Signal Processing Magazine, vol. 72, pp. 72-82 (2008).

Pruessmann et al., "SENSE: Sensitivity Encoding for Fast MRI," Magnetic Resonance in Medicine, vol. 42, No. 5, pp. 952-962 (1999).

Hammernik et al., "Learning a Variational Network for Reconstruction of Accelerated MRI Data," Magnetic Resonance in Medicine; vol. 79, pp. 3055-3071 (2018).

Chen et al., A simple fixed-point approach to invert a deformation fielda), Med. Phys., vol. 35, pp. 81-88 (2008).

Mar. 13, 2024 (US) Office Action—U.S. Appl. No. 17/411,527.

* cited by examiner

MAGNETIC RESONANCE IMAGING RECONSTRUCTION USING MACHINE LEARNING AND MOTION COMPENSATION

CROSS-REFERENCE TO RELATED APPLICATIONS

The present application claims the benefit of the filing date of Germany patent application no. DE 10 2020 210 775.0, filed on Aug. 26, 2020, the contents of which are incorporated herein by reference in their entirety.

TECHNICAL FIELD

The disclosure relates to magnetic resonance imaging (MRI) and, in particular, to machine-learned (ML) algorithms used for MRI reconstruction.

BACKGROUND

Acquisition of MRI data can require significant time. To accelerate the data acquisition, it is known to undersample k-space. Missing data can be reconstructed (MRI reconstruction).

Various techniques for implementing MRI reconstruction are known. One technique is referred to as compressed sensing. See, e.g., Lustig, Michael, David Donoho, and John M. Pauly. "Sparse MRI: The application of compressed sensing for rapid MR imaging." Magnetic Resonance in Medicine: An Official Journal of the International Society for Magnetic Resonance in Medicine 58.6 (2007): 1182-1195; also see Lustig, Michael, et al. "Compressed sensing MRI." IEEE signal processing magazine 25.2 (2008): 72-82.

Often, such techniques rely on representation of MRI images in a wavelet basis. As described in id., page 13, section "Image Reconstruction", an optimization problem—typically defined in an $l^1$-norm—can be defined. Data consistency can be enforced by a data-consistency operation ensuring that the reconstructed image is described well by the underlying k-space data sparsely sampled. The data-consistency operation is sometimes referred to as data-fidelity operation or forward-sampling operator. In addition to the data-consistency operation, oftentimes a regularization operation is considered. The regularization operation is conventionally based on a non-linear $l^1$-norm. A classic formulation of the regularization operation is based on sparsity of the MRI image in a transform domain such as a wavelet domain in combination with pseudo-random sampling that can introduce aliasing artifacts that are incoherent in the respective transform domain. Another example would be a Fourier domain, in particular for acquisitions of a dynamically moving target. Another example would be total variation (TV) used in connection with non-Cartesian k-space trajectories such as radial and spiral trajectories.

Based on the data-consistency operation and the regularization operation, an iterative optimization can be implemented. The iterative optimization can include multiple iterations, each iteration including the calculation of the data-consistency operation and the regularization operation in an alternating fashion.

Recently, the regularization operation has been implemented by means of deep neural networks. Here, different iterations of the optimization are implemented by different layers of the deep neural network. See Hammernik, Kerstin, et al. "Learning a variational network for reconstruction of accelerated MRI data." Magnetic resonance in medicine 79.6 (2018): 3055-3071, as well as Knoll, Florian, et al. "Deep learning methods for parallel magnetic resonance image reconstruction." arXiv preprint arXiv:1904.01112 (2019). Such techniques are based on the finding that wavelet compositions can be expressed as a subset of trainable convolutions of a deep neural network such as a convolutional neural network and that soft-thresholding can be used as an activation function in the deep neural network.

According to techniques, a sequence of MRI measurement datasets can be acquired during an extended time duration (measurement time duration). Throughout the measurement time duration, the region of interest may be subject to motion. The patient may move. Then, motion artifacts may occur in the MRI measurement datasets of the sequence acquired throughout the measurement time duration.

Such motion artifacts pose challenges on the acquisition and MRI reconstruction. Examples are free-breathing liver acquisitions and heart acquisitions. It has been observed that MRI reconstruction can become inaccurate where there is significant movement throughout the measurement time duration, due to motion artifacts.

SUMMARY

Accordingly, a need exists for advanced techniques of MRI reconstruction. In particular, a need exists for techniques of MRI reconstruction that alleviate or mitigate the impact of movement of the patient throughout the measurement time duration. This need is met by the embodiments as discussed herein and recited in the claims.

A computer-implemented method of reconstructing a sequence of MRI images is provided. The method includes obtaining a sequence of MRI measurement datasets. The MRI measurement datasets of the sequence of MRI measurement datasets are acquired using a respective undersampling trajectory in k-space and a receiver coil array. The sequence of MRI measurement datasets is acquired during a measurement time duration. During the measurement time duration, a movement of a patient occurs. The method includes performing an iterative optimization based on the MRI measurement datasets of the sequence of MRI measurement datasets. By performing the iterative optimization, a sequence of reconstructed MRI images is obtained. The iterative optimization includes, for each iteration of the multiple iterations of the iterative optimization, a regularization operation and a data-consistency operation. Thereby, a respective current MRI image is obtained. The data-consistency operation is based on differences between the MRI measurement datasets and synthesized MRI measurement datasets. The synthesized MRI measurement datasets are based on a k-space representation of the prior image of the multiple iterations, the undersampling trajectory, and a sensitivity map associated with the receiver coil array. An input to the regularization operation includes, for each iteration of the multiple iterations of the iterative optimization, a concatenation of multiple prior images obtained from a previous iteration of the multiple iterations. The multiple prior images are associated with multiple motion states of the movement of the patient, as well as with multiple points in time throughout the measurement time duration. The multiple prior images are warped from their respective motion state to a reference motion state.

A computer program or a computer-program product or a computer-readable storage medium includes program code. The program code can be loaded and executed by least one processor. The at least one processor, upon loading and executing the program code, performs a computer-implemented method of reconstructing a sequence of MRI images. The method includes obtaining a sequence of MRI measurement datasets. The MRI measurement datasets of the sequence of MRI measurement datasets are acquired using a respective undersampling trajectory in k-space and a receiver coil array. The sequence of MRI measurement datasets is acquired during a measurement time duration. During the measurement time duration, a movement of a patient occurs. The method includes performing an iterative optimization based on the MRI measurement datasets of the sequence of MRI measurement datasets. By performing the iterative optimization, a sequence of reconstructed MRI images is obtained. The iterative optimization includes, for each iteration of the multiple iterations of the iterative optimization, a regularization operation and a data-consistency operation. Thereby, a respective current MRI image is obtained. The data-consistency operation is based on differences between the MRI measurement datasets and synthesized MRI measurement datasets. The synthesized MRI measurement datasets are based on a k-space representation of the prior image of the multiple iterations, the undersampling trajectory, and a sensitivity map associated with the receiver coil array. An input to the regularization operation includes, for each iteration of the multiple iterations of the iterative optimization, a concatenation of multiple prior images obtained from a previous iteration of the multiple iterations. The multiple prior images are associated with multiple motion states of the movement of the patient, as well as with multiple points in time throughout the measurement time duration. The multiple prior images are warped from their respective motion state to a reference motion state.

A device includes at least one processor. The at least one processor can load and execute the program code. The at least one processor, upon loading and executing the program code, performs a computer-implemented method of reconstructing a sequence of MRI images. The method includes obtaining a sequence of MRI measurement datasets. The MRI measurement datasets of the sequence of MRI measurement datasets are acquired using a respective undersampling trajectory in k-space and a receiver coil array. The sequence of MRI measurement datasets is acquired during a measurement time duration. During the measurement time duration, a movement of a patient occurs. The method includes performing an iterative optimization based on the MRI measurement datasets of the sequence of MRI measurement datasets. By performing the iterative optimization, a sequence of reconstructed MRI images is obtained. The iterative optimization includes, for each iteration of the multiple iterations of the iterative optimization, a regularization operation and a data-consistency operation. Thereby, a respective current MRI image is obtained. The data-consistency operation is based on differences between the MRI measurement datasets and synthesized MRI measurement datasets. The synthesized MRI measurement datasets are based on a k-space representation of the prior image of the multiple iterations, the undersampling trajectory, and a sensitivity map associated with the receiver coil array. An input to the regularization operation includes, for each iteration of the multiple iterations of the iterative optimization, a concatenation of multiple prior images obtained from a previous iteration of the multiple iterations. The multiple prior images are associated with multiple motion states of the movement of the patient, as well as with multiple points in time throughout the measurement time duration. The multiple prior images are warped from their respective motion state to a reference motion state.

A computer-implemented method of reconstructing a sequence of MRI images is provided. The method includes obtaining a sequence of MRI measurement datasets. The MRI measurement datasets of the sequence of MRI measurement datasets are each acquired using an undersampling trajectory in k-space and a receiver coil array. The sequence of MRI measurement datasets is acquired during a measurement time duration during which a movement of the patient occurs. The method includes performing an iterative optimization to obtain a sequence of reconstructed MRI images based on the MRI measurement datasets. The iterative optimization includes, for each iteration of the multiple iterations of the iterative optimization, a regularization operation and a data-consistency operation to obtain a respective current MRI image. The data-consistency operation is based on differences between the MRI measurement datasets and synthesized MRI measurement datasets. The synthesized MRI measurement datasets are based on a k-space representation of the prior image of the multiple iterations, the undersampling trajectory, and a sensitivity map associated with the receiver coil array. An input to the regularization operation includes, for each iteration of the multiple iterations, a concatenation of multiple prior images obtained from a previous iteration of the multiple iterations. The multiple prior images are associated with multiple motion states of the movement of the patient and with multiple points in time throughout the measurement time duration. The regularization operation includes, for each iteration of the multiple iterations, a first convolution of the input in spatial domain, a second convolution of the input in time domain, and a third convolution of the input in motion state domain.

A computer program or a computer-program product or a computer-readable storage medium includes program code. The program code can be loaded and executed by least one processor. The at least one processor, upon loading and executing the program code, performs a computer-implemented method of reconstructing a sequence of MRI images. The method includes obtaining a sequence of MRI measurement datasets. The MRI measurement datasets of the sequence of MRI measurement datasets are each acquired using an undersampling trajectory in k-space and a receiver coil array. The sequence of MRI measurement datasets is acquired during a measurement time duration during which a movement of the patient occurs. The method includes performing an iterative optimization to obtain a sequence of reconstructed MRI images based on the MRI measurement datasets. The iterative optimization includes, for each iteration of the multiple iterations of the iterative optimization, a regularization operation and a data-consistency operation to obtain a respective current MRI image. The data-consistency operation is based on differences between the MRI measurement datasets and synthesized MRI measurement datasets. The synthesized MRI measurement datasets are based on a k-space representation of the prior image of the multiple iterations, the undersampling trajectory, and a sensitivity map associated with the receiver coil array. An input to the regularization operation includes, for each iteration of the multiple iterations, a concatenation of multiple prior images obtained from a previous iteration of the multiple iterations. The multiple prior images are associated with multiple motion states of the movement of the patient and with multiple points in time throughout the measurement time duration. The regularization operation includes, for each iteration of the multiple iterations, a first convolution of the input in spatial domain, a second convolution of the input in time domain, and a third convolution of the input in motion state domain.

A device includes at least one processor. The at least one processor can load and execute the program code. The at least one processor, upon loading and executing the program code, performs a computer-implemented method of reconstructing a sequence of MRI images. The method includes obtaining a sequence of MRI measurement datasets. The MRI measurement datasets of the sequence of MRI measurement datasets are each acquired using an undersampling trajectory in k-space and a receiver coil array. The sequence of MRI measurement datasets is acquired during a measurement time duration during which a movement of the patient occurs. The method includes performing an iterative optimization to obtain a sequence of reconstructed MRI images based on the MRI measurement datasets. The iterative optimization includes, for each iteration of the multiple iterations of the iterative optimization, a regularization operation and a data-consistency operation to obtain a respective current MRI image. The data-consistency operation is based on differences between the MRI measurement datasets and synthesized MRI measurement datasets. The synthesized MRI measurement datasets are based on a k-space representation of the prior image of the multiple iterations, the undersampling trajectory, and a sensitivity map associated with the receiver coil array. An input to the regularization operation includes, for each iteration of the multiple iterations, a concatenation of multiple prior images obtained from a previous iteration of the multiple iterations. The multiple prior images are associated with multiple motion states of the movement of the patient and with multiple points in time throughout the measurement time duration. The regularization operation includes, for each iteration of the multiple iterations, a first convolution of the input in spatial domain, a second convolution of the input in time domain, and a third convolution of the input in motion state domain.

A computer-implemented method of reconstructing a sequence of MRI images is provided. The method includes obtaining a sequence of MRI measurement datasets. The MRI measurement datasets of the sequence of MRI measurement datasets are each acquired using at least one undersampling trajectory in k-space and a receiver coil array. The sequence of MRI measurement datasets is acquired at multiple time offsets with respect to at least one excitation pulse; alternatively or additionally, the sequence of MRI measurement datasets is acquired at multiple time offsets with respect to a least one refocusing pulse. The method also includes performing an iterative optimization based on the MRI measurement datasets of the sequence of MRI measurement datasets. The iterative optimization includes, for each iteration of the multiple iterations of the iterative optimization, a regularization operation and a data-consistency operation to obtain a sequence of current MRI images. The current MRI images of the sequence are associated with different time offsets of the multiple time offsets. The data-consistency operation is based on differences between the MRI measurement datasets and synthesized MRI measurement datasets. The synthesized MRI measurement datasets are based on a k-space representation of a prior image of the multiple iterations, the undersampling trajectory, and a sensitivity map associated with the receiver coil array. An input to the regularization operation includes, for each iteration of the multiple iterations, a concatenation of multiple prior images obtained from a previous iteration of the multiple iterations. The multiple prior images are associated with multiple time offsets.

A computer program or a computer-program product or a computer-readable storage medium includes program code. The program code can be loaded and executed by least one processor. The at least one processor, upon loading and executing the program code, performs a computer-implemented method of reconstructing a sequence of MRI images. The method includes obtaining a sequence of MRI measurement datasets. The MRI measurement datasets of the sequence of MRI measurement datasets are each acquired using at least one undersampling trajectory in k-space and a receiver coil array. The sequence of MRI measurement datasets is acquired at multiple time offsets with respect to at least one excitation pulse; alternatively or additionally, the sequence of MRI measurement datasets is acquired at multiple time offsets with respect to a least one refocusing pulse. The method also includes performing an iterative optimization based on the MRI measurement datasets of the sequence of MRI measurement datasets. The iterative optimization includes, for each iteration of the multiple iterations of the iterative optimization, a regularization operation and a data-consistency operation to obtain a sequence of current MRI images. The current MRI images of the sequence are associated with different time offsets of the multiple time offsets. The data-consistency operation is based on differences between the MRI measurement datasets and synthesized MRI measurement datasets. The synthesized MRI measurement datasets are based on a k-space representation of a prior image of the multiple iterations, the undersampling trajectory, and a sensitivity map associated with the receiver coil array. An input to the regularization operation includes, for each iteration of the multiple iterations, a concatenation of multiple prior images obtained from a previous iteration of the multiple iterations. The multiple prior images are associated with multiple time offsets.

A device includes at least one processor. The at least one processor can load and execute the program code. The at least one processor, upon loading and executing the program code, performs a computer-implemented method of reconstructing a sequence of MRI images. The method includes obtaining a sequence of MRI measurement datasets. The MRI measurement datasets of the sequence of MRI measurement datasets are each acquired using at least one undersampling trajectory in k-space and a receiver coil array. The sequence of MRI measurement datasets is acquired at multiple time offsets with respect to at least one excitation pulse; alternatively or additionally, the sequence of MRI measurement datasets is acquired at multiple time offsets with respect to a least one refocusing pulse. The method also includes performing an iterative optimization based on the MRI measurement datasets of the sequence of MRI measurement datasets. The iterative optimization includes, for each iteration of the multiple iterations of the iterative optimization, a regularization operation and a data-consistency operation to obtain a sequence of current MRI images. The current MRI images of the sequence are associated with different time offsets of the multiple time offsets. The data-consistency operation is based on differences between the MRI measurement datasets and synthesized MRI measurement datasets. The synthesized MRI measurement datasets are based on a k-space representation of a prior image of the multiple iterations, the undersampling trajectory, and a sensitivity map associated with the receiver coil array. An input to the regularization operation includes, for each iteration of the multiple iterations, a concatenation of multiple prior images obtained from a previous iteration of the multiple iterations. The multiple prior images are associated with multiple time offsets.

It is to be understood that the features mentioned above and those yet to be explained below may be used not only in the respective combinations indicated, but also in other combinations or in isolation without departing from the scope of the disclosure.

BRIEF DESCRIPTION OF THE DRAWINGS/FIGURES

Embodiments of the present disclosure are described in detail below with reference to the accompanying drawings, to give those skilled in the art a clearer understanding of the abovementioned and other features and advantages of the present disclosure.

DETAILED DESCRIPTION

Some embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the disclosure will be described in detail with reference to the accompanying drawings. It is to be understood that the following description of embodiments is not to be taken in a limiting sense. The scope of the disclosure is not intended to be limited by the embodiments described hereinafter or by the drawings, which are taken to be illustrative.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various techniques described herein generally relate to MRI imaging. MRI data (or raw data) is acquired in k-space by sampling k-space. Parallel imaging can be applied. Here, MRI data is acquired using an array of receiver coils having a predefined spatial sensitivity. The set of MRI data (MRI measurement dataset) is sparsely sampled in k-space, i.e., MRI data is acquired below the Nyquist threshold for a given field of view. This is sometimes referred to as undersampling k-space. According to various examples, the MRI measurement datasets may be obtained using an undersampling trajectory. When acquiring MRI measurement datasets using an undersampling trajectory for certain k-space locations, raw MRI data is not sampled and the missing information is reconstructed later on. A so-called acceleration factor R is indicative of the fraction of those k-space locations along the undersampling trajectory for which no raw data samples are acquired. Larger (smaller) acceleration factors may result in a shorter (longer) scan times.

Then, MRI reconstruction is employed to reconstruct an MRI image (reconstructed MRI image) without or having reduced aliasing artifacts. The MRI reconstruction often relies on predetermined or calibrated coil sensitivity maps (CSMs) of multiple receiver coils of the RF receiver of the MRI device are used.

Various techniques rely on MRI reconstruction using ML algorithms. Oftentimes, a trained ML algorithm can outperform conventional reconstructions (including iterative approaches such as Compressed Sensing) when applied to a known/trained acquisition. This also goes by the name of deep learning (DL) reconstruction and typically relies on neural networks. According to examples, the reconstruction of an MRI dataset is facilitated using a machine-learning (ML) algorithm and/or using trained functions. As a general rule, the ML algorithm employed in the various examples may include a trained neural network, e.g., a deep-learning network. A deep neural network that can be used for implementing the regularization operation is the U-net, see Ronneberger, Olaf, Philipp Fischer, and Thomas Brox. "U-net: Convolutional networks for biomedical image segmentation." International Conference on Medical image computing and computer-assisted intervention. Springer, Cham, 2015. The U-net employs skip-connections between hidden layers and down-sampling and up-sampling of feature maps.

For example, an iterative optimization can include (i) a regularization operator—that is implemented by a trained neural network such as a Convolutional Neural Network (CNN)—for filtering of the input MRI dataset using convolutions and non-linear activations; and (ii) a data-consistency operator (sometimes referred to as forward-sampling operator or data fidelity operator) for computation of an MRI forward model to assure agreement of the reconstructed MRI dataset with the MRI measurement data.

This approach of using an iterative optimization together with a deep-neural network having layers associated with each iteration goes by the name of a variational neural network (VNN). The complete network is also called an unrolled image reconstruction network, or simply unrolled network.

Multiple iterations of (i) and (ii) iteratively refine the reconstructed MRI measurement dataset, wherein an appropriate optimization technique, for example a gradient descent optimization technique or Landweber iterations, or prima-dual method, or alternating direction method of multipliers as are known, may be used to optimize parameters from iteration to iteration, i.e., to minimize a goal function including the regularization operator and the data-consistency operator. Such optimization technique may define parts of the data-consistency operation. The data-consistency operation can be based on the squared $l_2$-norm of the difference between measured data and synthesized data using a signal model. A gradient can be considered, in accordance with the optimization technique. In particular for de-correlated data with Gaussian noise, this can be a good choice. The signal model can be SENSE-type and, in particular, may rely on predefined CSMs. The CSMs can be calculated separately.

By using the ML algorithm in the context of the iterative optimization and, more specifically, the regularization operation, an increased image quality of the respective reconstructed MRI dataset may be provided. A reduced noise amplification and reduced image artifacts can be obtained, in comparison with the conventional reconstruction techniques. The natural image appearance may be better preserved using ML algorithm, e.g., without causing significant blurring in comparison to techniques with hand-crafted regularization operators. Conventional compressed sensing techniques may be slow and may result in less natural looking images. Using the ML algorithm, faster image reconstruction may be achieved using a predefined number of iterations of the ML algorithm. The reconstruction time is usually several orders of magnitude faster than in other iterative methods. A further advantage of such deep-learning MRI reconstruction is that patient-specific tuning of the regularization operation of the iterative optimization is not required.

One or more parameters of the ML algorithm may be determined using a training based on a ground-truth MRI dataset, which may comprise reference MRI images with reduced MRI artifacts and/or noise amplification. The ground-truth MRI dataset can be used to generate synthetic undersampled MRI data and then MRI reconstruction can be used to reconstruct a synthetically undersampled dataset. An offline end-to-end training is possible to obtain better results.

Next, details with respect to the variational network/the unrolled network implementing the iterative optimization are described.

For an unrolled network, one considers N iterations. $\mathcal{U}=1 \ldots N$ is the index counting iterations of the optimization. The number of iterations is a hyperparameter, and the networks vary from iteration to iteration, possibly also in the architecture. At the beginning ($\mathcal{U}=0$), an initial guess for the image tensor $I^{(0)}$ is assumed, which has e.g. vanishing entries or which is an initial non-trained reconstruction. From there, in each iteration:

An image tensor $J^{(n)}$ is determined at which the next gradient will be evaluated. For known approaches this is a linear combination of the previous image tensors $I^{(n)}$, i.e.

$$J^{(n)} = \sum_{i=0}^{n-1} \lambda_i I^{(i)}.$$

The coefficients may be fixed or trained. For $\lambda_i = c\delta_{i,n-1}$ this is an ISTA-like iteration. Also Nesterov accelerations are used.

Moreover, the previous images may be concatenated to a tensor $\mathcal{J}^{(n)} = (I^{(0)}, \ldots, I^{(n-1)})$ with an additional dimension running over n. Then, one can determine from Eqn. 1:

$$J^{(n)} = K^{(n)} \otimes \mathcal{J}^{(n)}, \tag{1}$$

where the convolution kernel $K^{(n)}$ treats n as a channel (i.e. has dense connections for this dimensions) and may further convolute spatial and/or other existing dimensions. All known updates are a subset of this generalization.

Also, a restriction to a limited number of previous images is possible. Further, the convolution kernel $K^{(n)}$ may be considered as known (relying on conventional optimization with momentum), trained, but initialized with an initial guess based on conventional techniques or trained as the other parameters (with some random initialization scheme).

The gradient $g^{(n)}$ is calculated at $J^{(n)}$. Again, it is possible to stack all calculated gradients $\mathcal{G}^{(n)} = (g^{(1)}, \ldots, g^{(n)})$ or consider at least more than one gradient.

A new image candidate is calculated. In the most abstract form using Eqn. 2:

$$\tilde{I}^{(n)} = Q^{(n)} \otimes (\mathcal{J}^{(n)}, \mathcal{G}^{(n)}), \tag{2}$$

with convolution kernel $Q^{(n)}$. The latter may be externally provided and the formulation also covers conventional gradient descent optimization with and without momentum.

Finally $\tilde{I}^{(n)}$ is passed through a deep neural network $\mathcal{U}^{(n)}$ which serves as the regularization operation of Eqn. 3

$$I^{(n)} = \mathcal{U}^{(n)}(\tilde{I}^{(n)}). \tag{3}$$

This is the main trained component of the reconstruction. $I^{(N)}$ is the reconstructed MRI image.

As a general rule, various undersampling trajectories may be used. For instance, Cartesian undersampling trajectories can be used. It would also be possible to use non-Cartesian undersampling trajectories, e.g., spiral trajectories or random trajectories. Cartesian undersampling trajectories are also referred to as regular undersampling trajectories.

The amount of undersampling, e.g., missing data points to full sampling of k-space, is often referred to as acceleration factor. Firstly, for sake of simplicity, regular undersampling of k-space with acceleration factor R is assumed. A SENSE-type reconstruction can be used, see Pruessmann, Klaas P., et al. "SENSE: sensitivity encoding for fast MRI." *Magnetic Resonance in Medicine: An Official Journal of the International Society for Magnetic Resonance in Medicine* 42.5 (1999): 952-962.

R pixels are aliased in the phase encoding plane (considering 2-D or 3-D Cartesian undersampling trajectories) and for the linear parallel imaging problem only those are correlated. Assuming $N_c$ receiver channels, the SENSE reconstruction decouples and simplifies to the following problem, to be solved by an iterative optimization of Eqn. 4:

$$I = \arg\min_I \|CI - D\|^2, \tag{4}$$

where C is an $N_c \times R$ dimensional complex-valued matrix, I a vector with R elements, and D the aliased MRI data of an MRI data of an MRI dataset in image space with $N_c$ components. Equation (4) defines the data-consistency operation. It ensures that the k-space representation of the reconstructed image equals the measured data. The data-consistency operation is thus based on the difference between the MRI measurement dataset and a synthesized MRI measurement dataset that is based on the k-space representation of a prior image of the multiple iterations, the undersampling trajectory, and the CSMs, all included in the matrix C (thus, constituting the signal model). The reconstructed image is given in Eqn. 5 as"

$$I=(C^{\dagger}C)^{-1}C^{\dagger}D. \quad (5)$$

Thus, as will be appreciated from the above, the iterative optimization to obtain the reconstructed MRI image is performed based on the MRI measurement dataset that has been acquired using an undersampling trajectory of k-space and a receiver coil array. The iterative optimization includes, for each iteration the regularization operation, see equation (3) and the data-consistency operation, see equation (2), and equation (4). The regularization operation, as a general rule, can balance a trade-off between the data consistency and the prior image. The regularization operation can be based on prior knowledge on the expected properties of the MRI images. One goal of the regularization operation is to discriminate between the actual MRI image and aliasing artifacts due to the undersampling. Thus, as a general rule, the regularization operation depends on the undersampling trajectory.

According to various examples, it is possible to obtain a sequence of multiple MRI measurement datasets. Each MRI measurement dataset of the sequence can be acquired using a respective undersampling trajectory in k-space and a receiver coil array. The sequence of MRI measurements can be acquired sequentially in time domain, during a measurement time duration.

As a general rule, each MRI measurement dataset of the multiple MRI measurement datasets of the sequence can fully sampled the k-space within a given field of view.

Undersampling can be employed. In particular, comparably high acceleration factors can be used, e.g., acceleration factors of the undersampling trajectory that are not smaller than 3 or 4 or even 10.

As a general rule, it would be possible that different MRI measurement datasets of the sequence of MRI measurement datasets are acquired using the same or different undersampling trajectories in k-space.

The measurement time duration during which the sequence of MRI measurement datasets is acquired can be in the order of seconds or tens of seconds or even minutes. Thereby, the multiple MRI measurement datasets of the sequence can be used to form a movie clip illustrating dynamic behavior. This can be helpful to investigate, e.g., the impact of a contrast agent administered to a patient. This can be helpful to track a motion-dependent behavior of the patient. In any case, the measurement time duration can be long enough so that the MRI measurement datasets are subject to movement of the patient. In other words, there is a potential for motion artifacts.

Hereinafter, techniques are described that facilitate providing multiple reconstructed MRI images for the sequence of MRI measurement datasets without or with reduced motion artifacts.

Generally, these techniques rely on a joint regularization operation applied to multiple MRI images obtained in an iteration of the iterative optimization. That is, the regularization operation accepts multiple MRI images as an input. More specifically, the regularization operation has an input that includes a concatenation of multiple prior images obtained from a previous iteration of the multiple iterations.

The concatenation can correspond to a stacking of the multiple prior images along a channel dimensions of the ML algorithm, e.g., a deep neural network, implementing the regularization operation.

Such a concatenation of the multiple prior images can thus have a high dimensionality. For example, each prior image can have a 2-D or 3-D spatial dimension. A further dimension is added for time. Optionally, yet a further dimension is added for motion state.

Accordingly, it is possible that the regularization operation performs multiple convolutions, each convolution operating on all or a subset of these dimensions. Where the convolution operates only on a subset of these dimensions, an index of a dimension not subject to the convolution remains fixed in the respective convolution terms. To give a concrete example: AI deconvolution in motion states domain.

By using such a joint regularization operation, interdependencies between the multiple prior MRI images can be considered. In particular, a similarity or dissimilarity between such multiple prior MRI images can be considered. For example, a deep neural network implementing the regularization operation can include operations that are impacted by the pixel or voxel values of two or more of the multiple prior MRI images.

Various techniques are based on the finding that such a joint regularization operation including an input including the multiple prior MRI images can take into account that the multiple prior MRI images can correspond to different motion states of the movement of the patient and, hence, can be shifted or rotated or deformed with respect to each other. This can cause motion artifacts.

According to the techniques described herein, multiple options are available to mitigate or reduce motion artifacts. Some examples are summarized in Table 1 below.

TABLE 1 multiple options for mitigating motion artifacts. By using such options as illustrated in Table 1, the image quality can be increased.

| Option | Brief description | Details |
|---|---|---|
| I | Image warping prior to regularization operation | According to one option, it is possible that the input to the regularization operation includes, for each iteration of the multiple iterations, a concatenation of multiple prior images obtained from a previous iteration of the multiple iterations. These multiple prior images are associated with multiple motion states of the movement of the patient during the measurement time duration, as well as with multiple points in time throughout the measurement time duration. The multiple prior images are warped from the respective motion states to a reference motion state. This corresponds to aligning the multiple prior images with respect to each other. It is expected that for aligned prior images the regularization operation works better between different points in time and motion states. Option I can have the advantage - e.g., if compared to option II described below - that it may not be required to train the ML algorithm used for the regularization operation to compensate for different motion |

TABLE 1-continued multiple options for mitigating motion artifacts. By using such
options as illustrated in Table 1, the image quality can be increased.

| Option | Brief description | Details |
|---|---|---|
| | | states and/or points in time associated with the multiple MRI measurement datasets of the sequence. Then, the ML algorithm - e.g., a deep neural network - can be less focused on learning motion effects, and rather can focus on similarities of contrast behavior. |
| II | Image warping incorporated into regularization | According to a further option, it is possible that the regularization operation - e.g., implemented by a ML algorithm such as a deep neural network - has been trained to compensate motion artifacts. According to some options, it would be possible that the input to the regularization operation includes, for each iteration of the multiple iterations, a concatenation of multiple prior images obtained from a previous iteration of the multiple iterations. The multiple prior images are again associated with multiple motion states of the movement of the patient and with multiple points in time throughout the measurement time duration, as in option I. Then, the regularization operation can include, for each iteration of the multiple iterations, a first convolution of the input in spatial domain, a second convolution of the input in time domain, and a third convolution of the input in motion states domain. Thus, separate spatial, time and motion-state convolutions are executed. This helps in an increased flexibility in the perspective choice of time resolution, motion states, etc. These spatial, time and motion-state convolutions can also be trained separately. Thus, the training parameters can be reduced, therefore, a more generalizable unrolled network may be obtained for the regularization operation. |

First, details with respect to the option I of Table 1 will be explained. It is possible that the multiple prior images are warped from the respective motion states to the reference motion state using warping operators. The warping operators can be derived from motion fields. These warping operators transform an image from a first motion state to a second motion state. The warping operators may be fixed over the course of time. It is possible that the warping operators are not updated for every iteration of the iterative optimization, e.g., to increase performance and stability. The warping operators can specify a rigid transformation, e.g., including rotations, translations, and/or reflections. The warping operators can also include non-rigid contributions, e.g., skew or distort the MRI measurement datasets.

For example, scenarios are conceivable where both time resolution as well as motion-state resolution is provided. For instance, it would be possible to capture MRI datasets every couple of seconds—e.g. every 10 seconds—over a measurement time duration in the order of minutes—e.g. 5 to 10 minutes. Then, it is conceivable that the motion pattern underlying the motion states that are observed varies over the course of the measurement time duration.

It is possible that such changes in the motion pattern are not considered, e.g. that the warping operators remain fixed as a function of time within the measurement time duration.

The warping to an aligned state (reference motion state) in temporal and motion-state dimension is denoted as $\mathcal{W}$ and its inverse as $\mathcal{W}^{-1}$ (warping operators). $\mathcal{W}^{-1}$ corresponds to unwarping.

It is possible, but not mandatory, that the warping operators change over the course of the iterative optimization. In other words, it would be possible that $\mathcal{W}^{(n)}$ (as well as $\mathcal{W}^{(n)-1}$) are determined from $\tilde{I}^{(n)}$, $\tilde{I}^{(n-1)}$ or from $\mathcal{W}^{(n)-1}$ (as well as $\mathcal{W}^{(n-1)-1}$). More generally speaking, it would be possible that the warping operators are adjusted throughout the iterative optimization. Such an adjustment may depend on one or more prior images of one or more previous iterations of the iterative optimization and/or the current image. A respective registration can be performed between pairs of the one or more prior images and/or the current image. Alternatively or additionally, such adjustment may depend on one or more prior warping operators of one or more prior iterations of the iterative optimization.

Such a change of the warping operators over the course of the iterative optimization corresponds to a joint optimization of the warping operators and the MRI images. Thereby, both the quality of the current MRI images over the course of the iterations can be increased, as well as the quality of the current warping operators over the course of iterations.

Such techniques are based on the finding that the current images of early iterations of the iterative optimization can vary from implementation to implementation. In particular, an initial assumption of the current image for a first iteration of the iterative optimization can vary from implementation to implementation. For instance, all pixel values may be set to "0" for the initial current MRI image of the iterative optimization. As a general rule, a highly spatially-resolved registration between multiple MRI images may not be possible for early iterations of the iterative optimization, due to the limited accuracy. A registration and a limited spatial resolution may nonetheless be possible. This can be exploited in order to iteratively adjust the warping operators.

For instance, a spatial resolution of the warping operators may be increased as a function of the iterations. This can be aligned with the assumption that the reconstruction of the MRI images will become more and more accurate over the course of iterations.

Base on the warping operators, it is possible to generalize Eq. (3) in Eqn. 6 as"

$$I^{(n)} = \mathcal{W}^{(n)-1}(\mathcal{U}^{(n)}(\mathcal{W}^{(n)}(\tilde{I}^{(n)}))) \tag{6}$$

$\mathcal{W}^{(n)}$ as well as $\mathcal{W}^{(n)-1}$—defining an un-warping of the current MRI images to their respective motion states—may be determined through a known algorithm—e.g., image registration based on preliminary MRI images—or a neural network. In the latter case, the further unrolled network may be understood as a complete network and trained end-to-end along with the neural network that yields the warping operators. Examples of neural networks that can be used to determine the warping operators are given by: de Vos, Bob D., et al. "A deep learning framework for unsupervised affine and deformable image registration." *Medical image analysis* 52 (2019): 128-143; and Krebs, Julian, et al. "Unsupervised probabilistic deformation modeling for robust diffeomorphic registration." *Deep Learning in Medical Image Analysis and Multimodal Learning for Clinical Decision Support*. Springer, Cham, 2018. 101-109; and Balakrishnan, Guha, et al. "An unsupervised learning model for deformable medical image registration." *Proceedings of the IEEE conference on computer vision and pattern recognition.* 2018.

The warping operators can be determined or initialized based on a preliminary, further MRI reconstruction. Thus, the further MRI reconstruction can yield a sequence of preliminary MRI images based on the MRI measurement datasets of the sequence of MRI measurement datasets. It is then possible to determine the warping operators based on the sequence of preliminary MRI images. For example, an image registration between each one of the preliminary MRI images and a selected one of the preliminary MRI images can be performed. It would be possible that the warping operators are determined using a further neural network. The further neural network can implement the image registration. Also, conventional techniques for the image registration are possible.

For example, a conventional MRI reconstruction may be used to obtain the sequence of preliminary MRI images. It would be possible to rely on a compressed sensing MRI reconstruction.

The further image reconstruction can be based on low-resolution representations of the MRI measurement datasets. For example, it would be possible to discard certain raw data samples or discard, an image domain, pixels, or voxels. This makes it faster and less computationally expensive. At the same time, an accuracy achievable when determining the warping operators can be still sufficient. The low-resolution representations of the MRI measurement datasets may include any suitable resolutions that is lowered by discarding the aforementioned raw data samples, image domain, pixels, voxels, etc. For instance, compared with the original resolutions representations of the MRI measurement datasets, the low-resolution representations of the MRI measurement datasets may be any suitable proportion thereof in terms of reduced resolution thereof such as 90%, 75%, 50%, etc.

The inverse warping operators $\mathcal{W}^{-1}$ could be determined based on the forward warping operators $\mathcal{W}$. Such techniques are generally known, e.g., from Chen, Mingli, et al. "A simple fixed-point approach to invert a deformation field a." Medical physics 35.1 (2008): 81-88.

Thus, from the techniques described above, it follows that an unrolled network can be used to implement multiple operations. Such operations are summarized below in Table 2.

| operation | symbol | metadata | description/purpose |
| --- | --- | --- | --- |
| gradient | $\mathcal{G}$ | k-space data with sampling mask; CSMs | Data-consistency operation |
| motion convolution | $\mathcal{M}$ | — | convolution in motion state domain; this can be a 1-D convolution |
| spatial convolution | $\mathcal{S}$ | — | convolution in spatial direction; this can be a 2-D or 3-D convolution; part of the regularization operation |
| time convolution | $\mathcal{T}$ | — | convolution in time direction; this can be a 1-D convolution; part of the regularization operation |
| image warping | $\mathcal{W}$ | (inverse) deformation fields, i.e. warping operators | align images of in time and/or motion states; p |

Table 2: Specific network operations/layers map a set of prior MRI images to set of current MRI images. The set of MRI images is considered as a multi-dimensional tensor with indices referring to spatial, temporal, motion-state, and channel dimension. Thereby, concatenated MRI images are obtained. Spatial, temporal, and motion-state dimension are given by the desired output, even though downsampling is conceivable. The channel dimension is typically introduced in neural networks to increase the capacity of the network. In particular, convolutions can change the channel dimension. Also complex numbers may be split into two real numbers with differing channel index.

Various techniques are based on the finding that trainable algorithms such as neural networks are constructed from standardized operations that can be thought of as building blocks. The operations may have trainable parameters, such as convolution kernels. Further, some require additional metadata that depend on each separate model evaluation and may therefore be considered as additional input into the overall network. The metadata differ from hyperparameters in that sense.

For a k-space-based MRI reconstruction, a gradient layer computes the gradient of a data consistency term for a given image candidate obtained in an iteration of the iterative iteration. The gradient layer receives k-space data as additional input and also coil sensitivity maps (CSMs), which is also referred to as metadata here. The input is a concatenation of MRI images, i.e. the MRI images as a multi-dimensional tensor also including a time and/or motion-state index. For an image I denoted as I(x, t, m) when explicitly stating spatial (x), temporal (t) and motion-state (m) index, the gradient $\mathcal{G}$ (I) has the same dimensionality.

With intermediate results in the network evaluation additionally having a channel dimension, i.e., being a tensor A(x, t, m, c) with a channel index c, the convolutions $\mathcal{M}$, $\mathcal{S}$, and $\mathcal{T}$ exclusively act on the dimension given by their name though a convolution and also densely on the channel dimension. The latter case may differ between input and output. Thus, the motion-state convolution, time convolution and spatial convolution are all performed separately, at least in some examples. Also extensions such as $\mathcal{M S}$, performing a combined convolution on motion-state and spatial dimension are possible.

Such techniques as described above are based on the finding that a trained algorithm can outperform conventional reconstructions when applied to a known/trained acquisition. This also goes by the name of deep learning (DL) reconstruction, and typically relies on neural networks. Similarly, image registration is a non-linear optimization procedure that shares similarities with iterative reconstruction and Compressed Sensing. A major difference is that image registration is usually non-convex and the corresponding optimization procedure has multiple local minima (associated with mis-registrations). In contrast, there is often an emphasis to formulate image reconstruction as a convex optimization problem. This is also one of the motivations in Compressed Sensing to use an $l_1$-norm instead of an $l_0$-norm.

According to the techniques described herein, such MRI reconstruction, in particular using neural networks, can be combined with image registration by employing a 2-step or multi-step approach where a conventional or deep learning registration is performed after a first, preliminary image reconstruction—the first, preliminary image reconstruction can possibly also use deep learning or use conventional approaches, e.g., Compressed Sensing—and then a second reconstruction is used where the estimated motion fields that are obtained from the first, preliminary image reconstruction are used to determine the warping operators and unwarping operators.

This can find application in motion-resolve dynamic imaging. Here, 3-D or 2-D MRI images are created, with an additional dimension of time and motion state.

Furthermore, techniques are described above—see Table 1, example II—where a joint MRI reconstruction of multiple motion states and points in time is possible and according to which the deep neural network has components that implicitly compensate for the multiple motion states encountered throughout the measurement time duration. In particular, separated convolutions for spatial, temporal, and motion-state dimension can be implemented in this example, which results in fewer training parameters in the more generic network. In some examples, it would also be possible to perform separated convolutions for the spatial dimension, as well as for the combined temporal and motion-state dimension. That is, a 2-D or 3-D convolution for the spatial dimension may be executed, and a separate 2-D convolution may be executed for the combined time and motion state dimension.

Figure 1:
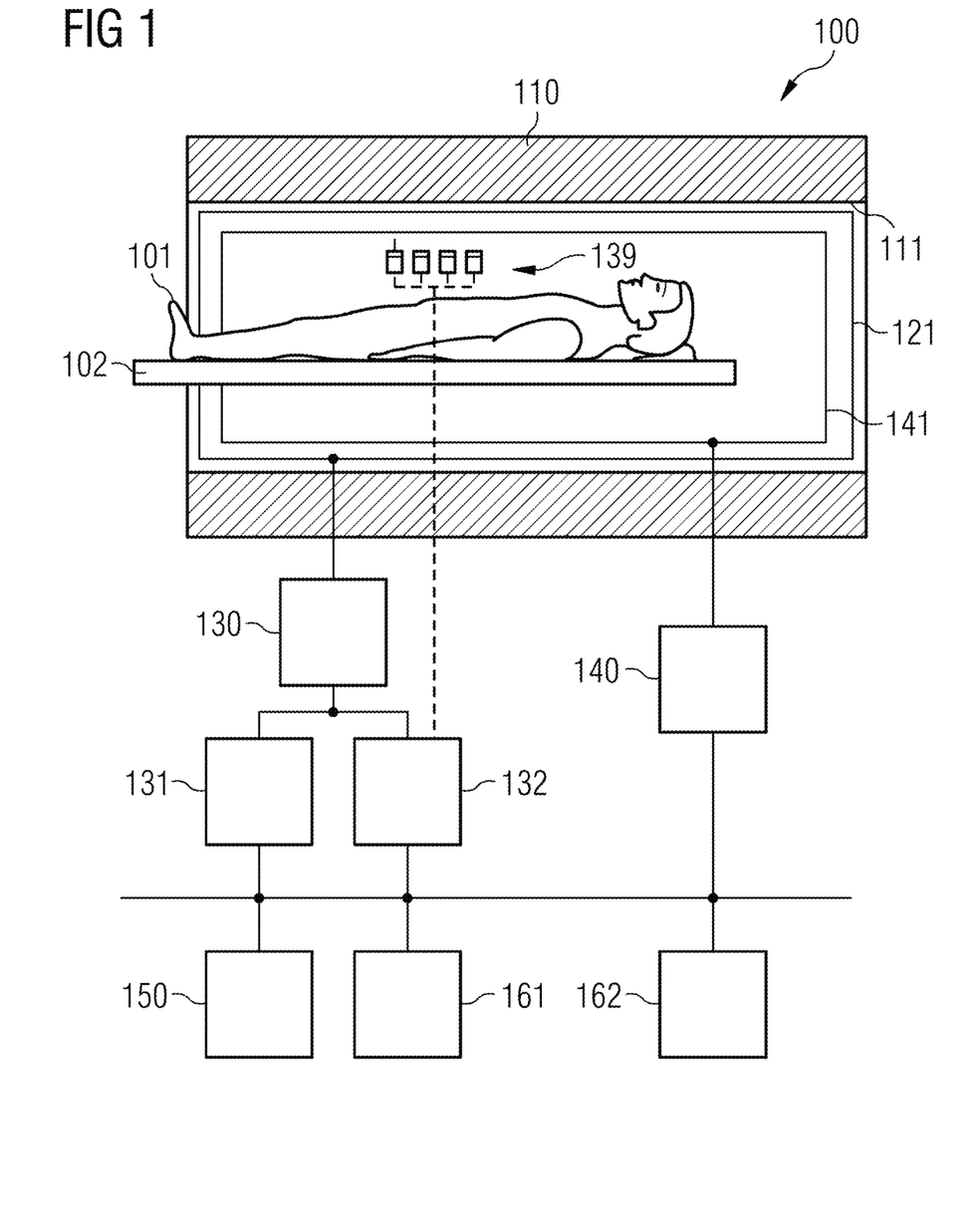
FIG. 1 schematically illustrates an example MRI device according to various embodiments.

FIG. 1 depicts aspects with respect to an MRI device 100. The MRI device 100 includes a magnet 110, which defines a bore 111. The magnet 110 may provide a DC magnetic field of any suitable strength (e.g. one to six Tesla) along its longitudinal axis. The DC magnetic field may align the magnetization of the patient 101 along the longitudinal axis. The patient 101 may be moved into the bore 111 by means of a movable table 102.

The MRI device 100 also includes a gradient system 140 for creating spatially-varying magnetic gradient fields (gradients) used for spatially encoding MRI data. Typically, the gradient system 140 includes at least three gradient coils 141 that are arranged orthogonal to each other and may be controlled individually. By applying gradient pulses to the gradient coils 141, it is possible to apply gradients along certain directions. The gradients may be used for slice selection (slice-selection gradients), frequency encoding (readout gradients), and phase encoding along one or more phase-encoding directions (phase-encoding gradients). Hereinafter, the slice-selection direction will be defined as being aligned along the Z-axis; the readout direction will be defined as being aligned with the X-axis; and a first phase-encoding direction as being aligned with the Y-axis. A second phase-encoding direction may be aligned with the Z-axis. The directions along which the various gradients are applied are not necessarily in parallel with the axes defined by the coils 141. Rather, it is possible that these directions are defined by a certain k-space trajectory, which, in turn, may be defined by certain requirements of the respective MRI sequence and/or based on anatomic properties of the patient 101.

For preparation and/or excitation of the magnetization polarized/aligned with the DC magnetic field, RF pulses may be applied. For this, an RF coil assembly 121 is provided which is capable of applying an RF pulse such as an inversion pulse or an excitation pulse or a refocusing pulse. While the inversion pulse generally inverts the direction of the longitudinal magnetization, excitation pulses may create transversal magnetization.

For creating such RF pulses, a RF transmitter 131 is connected via a RF switch 130 with the coil assembly 121. Via a RF receiver 132, it is possible to detect signals of the magnetization relaxing back into the relaxation position aligned with the DC magnetic field. In particular, it is possible to detect echoes; echoes may be formed by applying one or more RF pulses (spin echo) and/or by applying one or more gradients (gradient echo). The magnetization may be inductively coupled with the coil assembly 121 for this purpose. Thereby, raw MRI data in k-space is acquired; according to various examples, the associated MRI measurement datasets including the MRI data may be post-processed in order to obtain images. Such post-processing may include a Fourier Transform from k-space to image space. Such post-processing may also include MRI reconstruction configured to avoid motion artifacts.

Generally, it would be possible to use separate coil assemblies for applying RF pulses on the one hand side and for acquiring MRI data on the other hand side (not shown in FIG. 1). For example, for applying RF pulses a comparably large body coil 121 may be used; while for acquiring MRI data a surface coil assembly including an array of comparably small coils could be used. For example, the surface coil assembly could include 32 individual RF coils arranged as receiver coil array 139 and thereby facilitate spatially-offset coil sensitivities. Respective CMSs are defined.

The MRI device 100 further includes a human machine interface 150, e.g., a screen, a keyboard, a mouse, etc. By means of the human machine interface 150, a user input may be detected and output to the user may be implemented. For example, by means of the human machine interface 150, it is possible to set certain configuration parameters for the MRI sequences to be applied.

The MRI device 100 further includes a processing unit (e.g. a processor or processing circuitry) 161. The processor 161 may include a GPU and/or a CPU. The processor 161 may implement various control functionality with respect to the operation of the MRI device 100, e.g., based on program code loaded from a memory 162. For example, the processor 161 could implement a sequence control for time-synchronized operation of the gradient system 140, the RF transmitter 131, and the RF receiver 132. The processor 161 may also be configured to implement an MRI reconstruction, i.e. implement post-processing for MRI reconstruction of MRI images based on MRI measurement datasets.

It is not required in all scenarios that processor 161 implements post-processing for reconstruction of the MRI images. In other examples, it would be possible that respective functionalities implemented by a separate device, such as the one as illustrated in FIG. 2.

Figure 2:
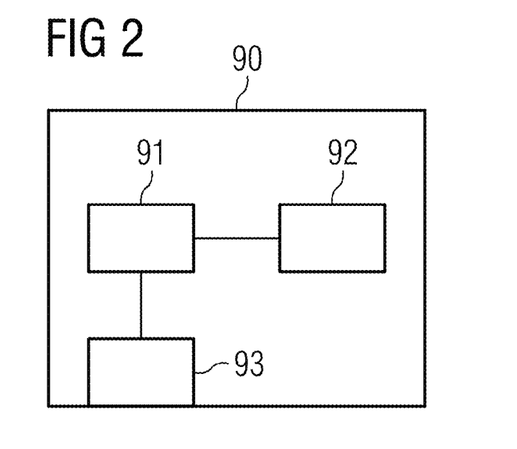
FIG. 2 schematically illustrates an example device according to various embodiments.

FIG. 2 schematically illustrates a device 90 according to various examples. The device 90 includes a processing unit/processor 91 and a memory 92. The processor 91 can obtain an MRI measurement dataset via an interface 93, e.g., from a hospital database, a computer-readable storage medium, or directly from an MRI device 100 as discussed in connection with FIG. 1. Upon loading program code from the memory 92, the processor 91 can post-process the MRI measurement dataset, to reconstruct an MRI image. Details with respect to such processing are illustrated in connection with FIG. 3.

Figure 3:
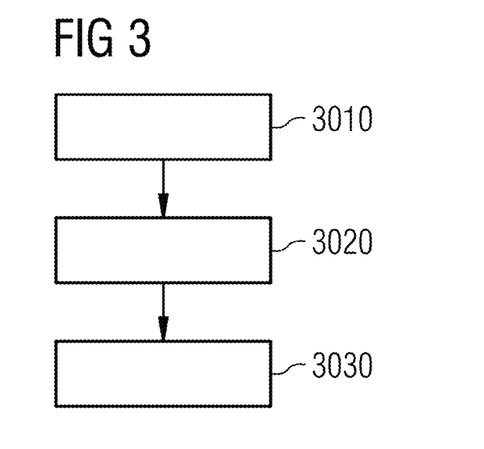
FIG. 3 is a flowchart of an example method according to various embodiments.

FIG. 3 is a flowchart of a method according to various examples. For illustration, the method of FIG. 3 could be executed by the processor 161 of the MRI device 100, upon loading program code from the memory 162. It would be possible that the method of FIG. 3 is executed by the processor 91 of the device 90, upon loading program code from the memory 92.

At block 3010, a sequence of MRI measurement dataset is obtained. The MRI measurement datasets have been acquired using an undersampling trajectory of k-space and a receiver coil array (cf. FIG. 1, MRI device 100, receiver coil array 139).

Next, at block 3020, an iterative optimization is performed to obtain a sequence of reconstructed 2-D or 3-D MRI image. This corresponds to MRI reconstruction. Each reconstructed MRI image of the sequence can correspond to a certain point in time and/or motion state.

At block 3030, the reconstructed MRI images output, e.g., to the user via a user interface. A movie clip may be presented. The reconstructed MRI images could also be stored.

Details with respect to the iterative optimization of block 3020 are described below in connection with FIG. 4.

Figure 4:
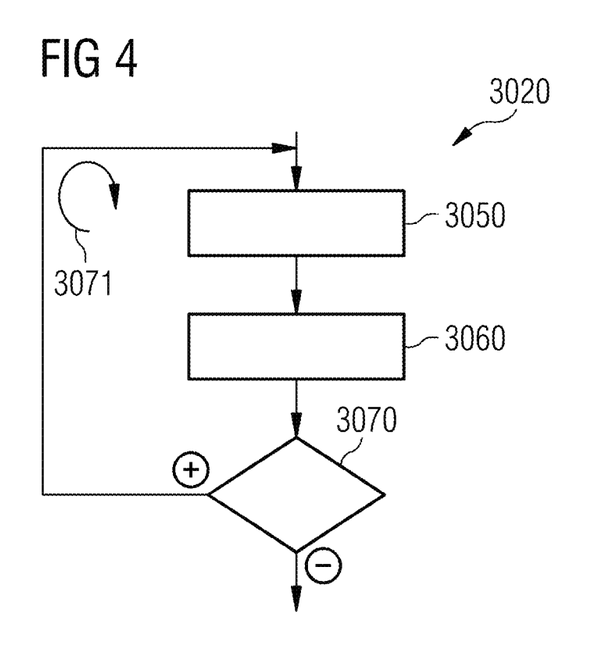
FIG. 4 is a flowchart of an example method according to various embodiments.

FIG. 4 illustrates multiple iterations 3071. Each iteration 3071 includes a regularization operation at block 3050 and a data-consistency operation at block 3060.

A concrete implementation of block 3050 and block 3060 could be based on Knoll, Florian, et al. "Deep learning methods for parallel magnetic resonance image reconstruction." arXiv preprint arXiv:1904.01112 (2019): equation 12. Here, the left term included in the bracket corresponds to the regularization operation and the right term included in the bracket corresponds to the data-consistency operation. In this publication, motion artifacts are not compensated.

Then, at block 3070, it is checked whether a further iteration is required; and, in the affirmative, block 3050 and block 3060 are re-executed.

It would be possible that at block 3070 it is checked whether a certain predefined count of iterations has been reached. This can be an abort criterion. Other abort criteria are conceivable, e.g., as defined by the optimization method (convergence into a minimum), e.g., gradient descent.

Figure 5:
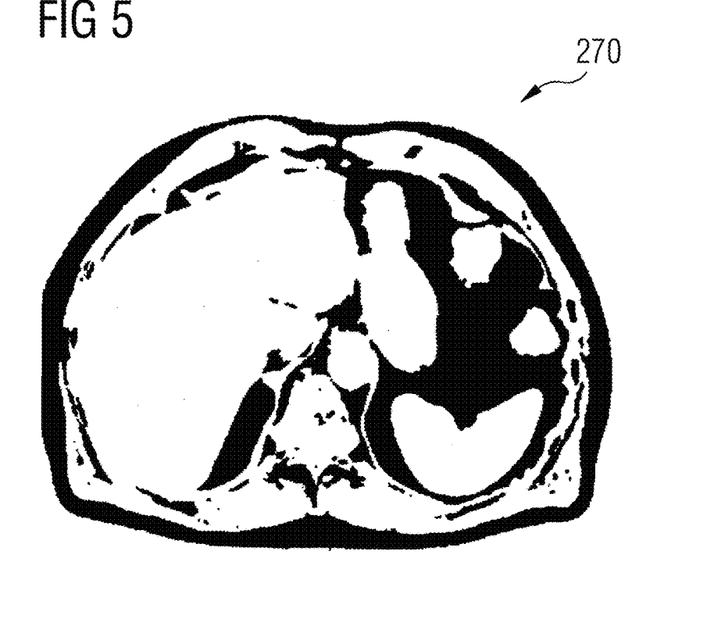
FIG. 5 is an example MRI image according to various embodiments.

FIG. 5 schematically illustrates aspects with respect to an MRI image 270. FIG. 5 schematically illustrates the MRI image 270. For instance, the MRI image 270 may be obtained in a certain iteration 3071.

FIG. 5 illustrates a 2-D MRI image 270; but it would also be possible to implement the techniques described herein for 3D MRI images 270.

According to various examples, for each iteration 3071, multiple such MRI images 270 may be obtained, for multiple motion states and points in time. It is possible to concatenate such multiple MRI images 270 and then input the concatenation of MRI images 270 to the regularization operation.

Figure 6:
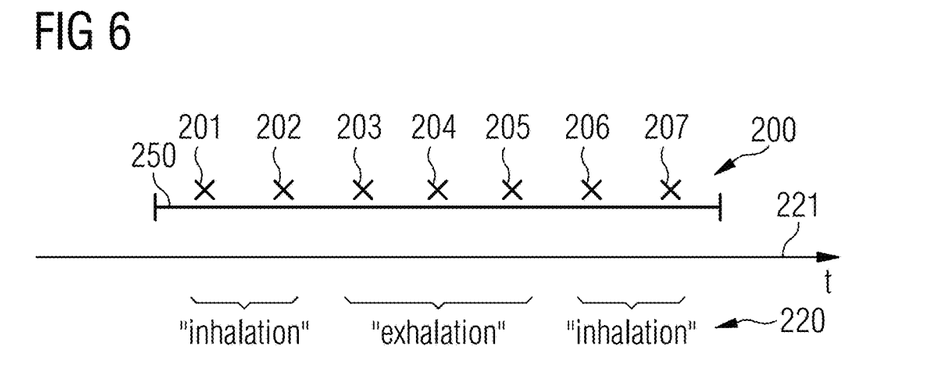
FIG. 6 schematically illustrates an example measurement time duration and motion states of the movement of the patient during the measurement time duration according to various embodiments.

FIG. 6 illustrates a measurement time duration 250 extending in time domain 221. A sequence 200 of MRI images 201-207 are obtained at different points in time within the measurement time duration 250. Also, the multiple MRI images 201-207 are associated with different motion states 220, as illustrated herein with respect to a movement induced by a breathing of the patient.

Each MRI image 201-207 may be acquired using a respective MRI protocol, e.g., including one or more RF pulses and sampling durations. For example, a spin-echo or gradient echo MRI protocol may be used.

As a general rule, it would be possible that the spatial resolution of the MRI images 201-207 is varied over the course of iterations 3071. Alternatively or additionally, a resolution in time domain and/or motion-state domain may be varied over the course of the iterations 3071.

For example, for earlier iterations the reconstruction may be downsampled. For example, time points may be combined, in the most extreme combined to one averaged time point at the beginning. This accelerates the reconstruction and is sufficient for the estimation of motion fields when no temporal change for the latter is assumed. In such a scenario in may not be required to perform a separate MRI reconstruction to obtain preliminary MRI images, but it is rather possible that the warping operators are determined based on MRI images of the iterative optimization obtained at early iterations.

Alternatively or additionally, the spatial resolution may be lowered (also by limiting k-space data to those in a smaller mask). This is in particular of interest because conventional motion field estimations also work on a resolution pyramid. Therefore, the motion field estimation may be in aligned with a spatial upsampling.

Also, the number of motion states may be reduced/combined initially.

Figure 7:
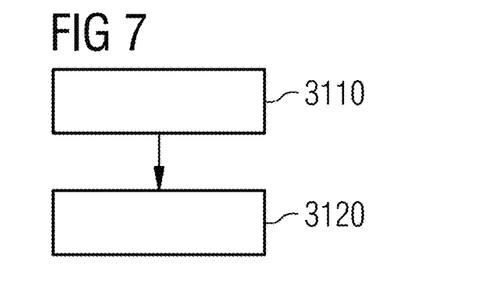
FIG. 7 is an example flowchart of a method according to various embodiments

FIG. 7 is a flowchart of a method according to various examples. FIG. 7 illustrates that at block 3120 inference is implemented, i.e., MRI images are reconstructed from MRI measurement datasets without a ground truth of the reconstructed MRI images being available. This is based on techniques as described above, e.g., in connection with FIG. 3. The MRI reconstruction relies on a convolutional deep neural network. Machine learning can be implemented to train the convolutional deep neural network. This machine learning takes place in the training phase at block 3110. Weights of an unrolled network can be trained.

The training at the training phase at block 3110 can include a further iterative optimization, i.e., different to the iterative optimization described in connection with FIG. 4. The purpose of the iterative optimization of block 3110 is determining weights of the convolutional neural network. For this, a loss function can be considered for each iteration. The loss function is based on a difference between an output of the convolutional neural network at that iteration and a MRI image that has been predefined as ground truth. This means that the loss function can take smaller values if the difference is smaller; then, the convolutional network approximates the synthesized MRI image accurately, e.g., without aliasing artifacts. Depending on the value of the loss function, it is then possible to adjust weights of the convolutional neural network. This can be based on techniques such as back propagation.

The ground truth can be obtained from MRI measurement datasets that are based on a fully sampled k-space. The training strategy may be supervised, i.e. ground truth data are obtained by longer acquisitions e.g. using averaging and curated by human inspection.

This convolutional network that has been appropriately trained can then be used to implement the regularization operation at block 3050 of FIG. 4.

Regarding the training at block 3110, in particular in a scenario according to the example II of Table 1, it is possible to separately train the component of the machine learning algorithms pertaining to the spatial convolution, the temporal convolution, and the motion-state convolution.

In particular, where a first component of the machine learning algorithm is trained, a comparably low resolution for a second component of the machine learning algorithm can be assumed. For instance, it would be possible that, initially, the component of the machine learning algorithms pertaining to the spatial convolution is trained for a comparably low temporal resolution. Once the component of the machine learning algorithms pertaining to the spatial convolution has been trained, a higher temporal resolution can be used for the training of the component pertaining to the temporal convolution.

For a scenario in which the warping operators are determined from an image registration that is implemented using a ML algorithm, it is possible to implement an end-to-end training of the respective ML algorithm used to determine the warping operators and the ML algorithm implementing the regularization operation.

Although the disclosure has been shown and described with respect to certain preferred embodiments, equivalents and modifications will occur to others skilled in the art upon the reading and understanding of the specification. The present disclosure includes all such equivalents and modifications and is limited only by the scope of the appended claims.

For illustration, it would be possible that an input to the regularization operation includes an indicator indicative of a motion state of the movement of the patient associated with each one of the MRI measurement datasets of the sequence of MRI measurement datasets.

More generally, it is possible to include an additional components in the trainable regularization operation that help to align MRI images with same contrast but different excitation. This allows the algorithm to better align contrasts. For example, additional data indicative of the motion state such as respiratory signal or ECG may be acquired. This may be used to determine suitable training data (e.g. only combine data with same physiological state). It may also be used to determine realistic augmentation schemes. Finally, it can be also insert into the trainable algorithm so that it learns to address these physiological changes.

For further illustration, while various examples have been described in connection with an implementation of the regularization operation using an artificial neural network, in other examples, other implementations of the regularization operation are conceivable. For instance, a non-ML implementation would be conceivable.

What is claimed is:

1. A computer-implemented method of reconstructing a sequence of magnetic resonance imaging (MRI) images, comprising:
    obtaining, via one or more processors, a sequence of MRI measurement datasets that have been acquired during a measurement time duration during which patient movement occurs, each respective one of MRI measurement datasets of the sequence of MRI measurement datasets being acquired using a respective under-sampling trajectory in k-space and a receiver coil array; and
    performing, via the one or more processors, an iterative process to obtain a sequence of reconstructed MRI images based on the MRI measurement datasets,
    wherein the iterative process comprises, for each iteration of multiple iterations of the iterative process, a regularization operation and a data-consistency operation to obtain a respective current MRI image,
    wherein the data-consistency operation is based on differences between the MRI measurement datasets and synthesized MRI measurement datasets, the synthesized MRI measurement datasets being based on a k-space representation of a prior MRI image of the multiple iterations, an undersampling trajectory, and a sensitivity map associated with the receiver coil array, and
    wherein an input to the regularization operation comprises, for each iteration of the multiple iterations, a concatenation of multiple prior images obtained from a previous iteration of the multiple iterations, the multiple prior images being associated with multiple motion states of the patient movement and with multiple points in time throughout the measurement time duration, the multiple prior images being warped from their respective motion states to a reference motion state.

2. The computer-implemented method of claim 1, wherein the multiple prior images are warped to the reference motion state by applying warping operators between the multiple motion states and the reference motion state, the method further comprising:
    performing, via the one or more processors, a further image reconstruction of a sequence of preliminary MRI images based on the MRI measurement datasets, and
    determining, via the one or more processors, the warping operators from a sequence of motion states of the movement of the patient to and from the reference motion state based on the sequence of preliminary MRI images.

3. The computer-implemented method of claim 2, wherein the further image reconstruction is based on representations of the MRI measurement datasets having a reduction in resolution.

4. The computer-implemented method of claim 2, wherein the warping operators are determined based on image registrations between pairs of preliminary MRI images of the sequence of preliminary MRI images.

5. The computer-implemented method of claim 2, further comprising:
    for at least one iteration of the multiple iterations of the iterative process, adjusting the warping operators based on at least one of the prior image and the current image of the respective iteration.

6. The computer-implemented method of claim 2, wherein:
    the warping operators are determined using a neural network,
    the regularization operation is implemented by a further neural network, and
    the neural network and the further neural network are trained end-to-end.

7. The computer-implemented method of claim 6, wherein:
    the warping operators are determined using a neural network and based on image registrations between pairs of preliminary MRI images of the sequence of preliminary MRI images,
    the regularization operation and the image registrations are implemented by a further neural network, and
    the neural network and the further neural network are trained end-to-end.

8. The computer-implemented method of claim 1, wherein an output of the regularization operation comprises a concatenation of multiple current MRI images, the method further comprising:
    un-warping each one of multiple current MRI images from the reference motion state to a respective motion state associated with the patient movement.

9. The computer-implemented method of claim 1, wherein the regularization operation is implemented by a trained neural network, and
   wherein the concatenation of the multiple prior images corresponds to a stacking of the multiple prior images along a channel dimension of the trained neural network.

10. The computer-implemented method of claim 9, wherein the regularization operation is performed as a joint regularization to determine, via the neural network, interdependencies between the concatenation of the multiple prior images.

11. The computer-implemented method of claim 1, wherein the regularization operation comprises one or more operations that are impacted by pixel or voxel values of two or more images from among the concatenation of the multiple prior images.

12. The computer-implemented method of claim 1, wherein the regularization operation discriminates between MRI images and aliasing artifacts due to undersampling.

13. A computer-implemented method of reconstructing a sequence of magnetic resonance imaging (MRI) images, the method comprising:
   obtaining, via one or more processors, a sequence of MRI measurement datasets that have been acquired during a measurement time duration during which a patient movement occurs, each respective one of MRI measurement datasets of the sequence of MRI measurement datasets being acquired using an under-sampling trajectory in k-space and a receiver coil array; and
   performing, via one or more processors, an iterative process to obtain a sequence of reconstructed MRI images based on the MRI measurement datasets,
   wherein the iterative process comprises, for each iteration of multiple iterations of the iterative process, a regularization operation and a data-consistency operation to obtain a respective current MRI image,
   wherein the data-consistency operation is based on differences between the MRI measurement datasets and synthesized MRI measurement datasets, the synthesized MRI measurement datasets being based on a k-space representation of a prior image of the multiple iterations, an undersampling trajectory, and a sensitivity map associated with the receiver coil array,
   wherein an input to the regularization operation comprises, for each iteration of the multiple iterations, a concatenation of multiple prior images obtained from a previous iteration of the multiple iterations, the multiple prior images being associated with multiple motion states of the patient movement and with multiple points in time throughout the measurement time duration, and
   wherein the regularization operation comprises, for each iteration of the multiple iterations, a first convolution of the input in spatial domain, a second convolution of the input in time domain, and a third convolution of the input in motion-state domain.

14. The computer-implemented method of claim 13, wherein the first convolution is a two-dimensional (2-D) or a three-dimensional (3-D) convolution, and wherein the second convolution and the third convolution are one-dimensional (1-D) convolutions, respectively.

15. The computer-implemented method of claim 13, further comprising:
   separately training components of the regularization operation associated with the first convolution, the second convolution, and the third convolution.

16. The computer-implemented method of claim 15, wherein a resolution in at least one of the time domain and the motion-state domain is reduced when training the component of the regularization operation associated with the first convolution.

17. The computer-implemented method of claim 13, further comprising:
   increasing a spatial resolution of the current MRI images over the multiple iterations.

18. The computer-implemented method of claim 13, further comprising:
   increasing a temporal resolution of the current MRI images over the multiple iterations.

19. The computer-implemented method of claim 13, further comprising:
   increasing a motion-state resolution of the current MRI images over the multiple iterations.

20. A computer-readable storage medium comprising program code that, when executed by at least one processor, cause the at least one processor to reconstruct a sequence of magnetic resonance imaging (MRI) images by:
   obtaining a sequence of MRI measurement datasets that have been acquired during a measurement time duration during which patient movement occurs, MRI measurement datasets of the sequence of MRI measurement datasets being acquired using a respective under-sampling trajectory in k-space and a receiver coil array; and
   performing an iterative process to obtain a sequence of reconstructed MRI images based on the MRI measurement datasets,
   wherein the iterative process comprises, for each iteration of multiple iterations of the iterative process, a regularization operation and a data-consistency operation to obtain a respective current MRI image,
   wherein the data-consistency operation is based on differences between the MRI measurement datasets and synthesized MRI measurement datasets, the synthesized MRI measurement datasets being based on a k-space representation of a prior MRI image of the multiple iterations, an undersampling trajectory, and a sensitivity map associated with the receiver coil array, and
   wherein an input to the regularization operation comprises, for each iteration of the multiple iterations, a concatenation of multiple prior images obtained from a previous iteration of the multiple iterations, the multiple prior images being associated with multiple motion states of the patient movement and with multiple points in time throughout the measurement time duration, the multiple prior images being warped from their respective motion states to a reference motion state.

* * * * *